US009307326B2

(12) United States Patent
Elko

(10) Patent No.: US 9,307,326 B2
(45) Date of Patent: Apr. 5, 2016

(54) SURFACE-MOUNTED MICROPHONE ARRAYS ON FLEXIBLE PRINTED CIRCUIT BOARDS

(75) Inventor: Gary W. Elko, Summit, NJ (US)

(73) Assignee: MH Acoustics LLC, Summit, NJ (US)

( * ) Notice: Subject to any disclaimer, the term of this patent is extended or adjusted under 35 U.S.C. 154(b) by 777 days.

(21) Appl. No.: 13/516,842

(22) PCT Filed: Dec. 21, 2010

(86) PCT No.: PCT/US2010/061445

§ 371 (c)(1), (2), (4) Date: Jun. 18, 2012

(87) PCT Pub. No.: WO2011/087770

PCT Pub. Date: Jul. 21, 2011

(65) Prior Publication Data

US 2012/0275621 A1 Nov. 1, 2012

Related U.S. Application Data

(60) Provisional application No. 61/289,033, filed on Dec. 22, 2009, provisional application No. 61/299,019, filed on Jan. 28, 2010.

(51) Int. Cl.
*G06F 17/00* (2006.01)
*H04R 19/01* (2006.01)

(52) U.S. Cl.
CPC .............. *H04R 19/016* (2013.01); *H04R 19/01* (2013.01)

(58) Field of Classification Search
CPC ................................ H04R 19/016; H04R 3/00
See application file for complete search history.

(56) References Cited

U.S. PATENT DOCUMENTS 6,041,127 A 3/2000 Elko
6,069,958 A 5/2000 Weisel
(Continued)

FOREIGN PATENT DOCUMENTS

CN 201131056 Y 10/2008
EP 0869697 A2 10/1998
(Continued)

OTHER PUBLICATIONS

European Search Report; Mailed on May 4, 2015 for corresponding EP Application No. EP10843526.4.
(Continued)

*Primary Examiner* — Fan Tsang
*Assistant Examiner* — Eugene Zhao
(74) *Attorney, Agent, or Firm* — Mendelsohn Dunleavy, P.C.; Steve Mendelsohn

(57) ABSTRACT

A microphone array, having a three-dimensional (3D) shape, has a plurality of microphone devices mounted onto (at least one) flexible printed circuit board (PCB), which is bent to achieve the 3D dimensional shape. Output signals from the microphone devices can be combined (e.g., by weighted or unweighted summation or differencing) to form sub-element output signals and/or element output signals, and ultimately a single array output signal for the microphone array. The PCB may be uniformly flexible or may have rigid sections interconnected by flexible portions. Possible 3D shapes include (without limitation) cylinders, spirals, serpentines, and polyhedrons, each formed from a single flexible PCB. Alternatively, the microphone array may be an assembly of multiple, interconnecting sub-arrays, each having two or more rigid portions separated by one or more flexible portions, where each sub-array has at least one cut-out portion for receiving a rigid portion of another sub-array.

36 Claims, 7 Drawing Sheets

400

(56) References Cited

U.S. PATENT DOCUMENTS

| | | | | |
|---|---|---|---|---|
| 7,599,248 | B2 | 10/2009 | Williams | |
| 7,636,437 | B2 * | 12/2009 | Gronroos et al. | 379/428.02 |
| 2001/0036266 | A1 * | 11/2001 | Gronroos | H01M 1/0237 379/433.01 |
| 2003/0068059 | A1 * | 4/2003 | Blok et al. | 381/361 |
| 2004/0076305 | A1 | 4/2004 | Santiago | |
| 2005/0123149 | A1 * | 6/2005 | Elko et al. | 381/92 |
| 2008/0013770 | A1 | 1/2008 | Wu et al. | |
| 2009/0238393 | A1 * | 9/2009 | Zhang | 381/361 |
| 2010/0195842 | A1 | 8/2010 | Sibbald | |
| 2011/0096951 | A1 * | 4/2011 | Lee et al. | 381/352 |

FOREIGN PATENT DOCUMENTS

| | | | |
|---|---|---|---|
| JP | 02271843 | A | 11/1990 |
| JP | 2005311125 | A | 11/2005 |
| JP | 2009002740 | A | 1/2009 |
| KR | 20050091444 | A | 9/2005 |
| WO | WO2007123300 | A1 | 11/2007 |

OTHER PUBLICATIONS

Meyer, J., et al., "A Highly Scalable Spherical Microphone Array Based on an Orthonormal Decomposition of the Soundfield," IEEE International Conference on Acoustics, Speech, and Signal Processing Proceedings, 2002, Orlando, Fl. and New York, NY, pp. II-1781-II-1784.

International Search Report and Written Opinion of the International Search Authority for PCT International Application No. PCT/US2010/061445; Aug. 9, 2011; 9 pages.

* cited by examiner

200

SURFACE-MOUNTED MICROPHONE ARRAYS ON FLEXIBLE PRINTED CIRCUIT BOARDS

CROSS-REFERENCE TO RELATED APPLICATIONS

This application claims the benefit of the filing dates of U.S. provisional application No. 61/289,033, filed on Dec. 22, 2009, and U.S. provisional application No. 61/299,019, filed on Jan. 28, 2010, the teachings of both of which are incorporated herein by reference in their entirety.

BACKGROUND

1. Field of the Invention

The present invention relates to audio engineering and, more specifically but not exclusively, to microphone arrays.

2. Description of the Related Art

This section introduces aspects that may help facilitate a better understanding of the invention. Accordingly, the statements of this section are to be read in this light and are not to be understood as admissions about what is prior art or what is not prior art.

With the recent availability of inexpensive, small, surface-mount MEMS (microelectromechanical systems) and electret microphone devices, it is now possible to build microphone arrays having large numbers of microphone devices in ways that would have been nearly impossible just a short time ago. One interesting aspect of using surface-mount technology is that microphone devices can be mounted like any other semiconductor or passive component to a printed circuit board (PCB). Surface mounting microphone devices allows one to place a large number of microphone devices in a fast and inexpensive way. Placing the microphone devices directly on the PCB also allows one to interconnect and combine the microphone devices directly in either the analog or digital domain on the same PCB on which the microphone devices are mounted. Conventional, rigid PCB technology, however, limits the array geometry to planar configurations for the array manifold.

SUMMARY

Problems in the prior art are addressed in accordance with the principles of the present invention by mounting microphone devices on flexible PCBs that are now used in miniaturized product design and as interconnects in complex multi-board systems, to allow more-general microphone array geometries. For example, mounting inexpensive, small, surface-mount MEMS or electret microphone devices in certain configurations on flexible PCBs can be used to realize high-quality, professional-grade, directional microphone arrays.

In one embodiment, the present invention is a microphone array comprising a flexible printed circuit board (PCB) and a plurality of microphone devices mounted onto the flexible PCB.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 4(A) shows a perspective view of a 3D microphone array having the polyhedral shape of a 60-sided Pentakis Dodecahedron, while

DETAILED DESCRIPTION

Flexible PCBs and Microphone Arrays

Figure 1A:
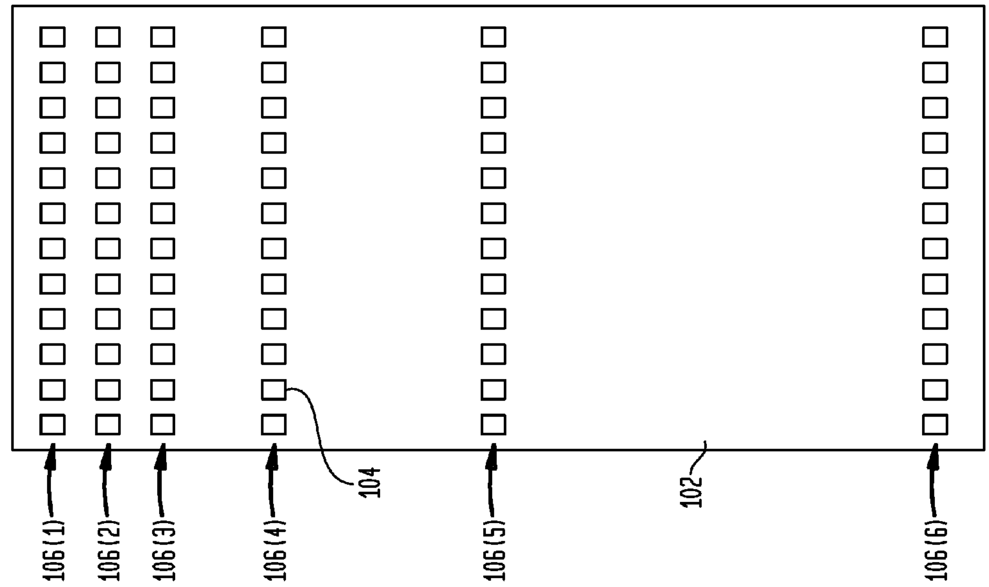
FIG. 1 shows a six-element, cylindrical microphone array comprising a flexible printed circuit board (PCB) and a plurality of surface-mounted microphone devices arranged for form six microphone elements.

Flexible PCB technology using layers of copper traces and insulating films have become a standard way for designers to connect other subsystems needing a large number of connections in tight spaces. Miniaturized devices use this technology to pack the entire volume of the device as much as possible.

Flexible PCBs have layers of copper wedged in between layers of insulating film. The insulating layers are commonly made from polyimide films, such as (but not limited to) Kapton® polyimide films from DuPont of Wilmington, Del. Flexible PCBs can currently be made with up to about six layers, with the bending stiffness increasing as the number of layers increases.

Flexible PCBs can be populated with components using standard pick-and-place PCB-manufacturing equipment. Solder connection of the components to the boards is also done in a similar manner as for conventional, rigid PCBs. Flexible PCBs can be entirely flexible or can contain both flexible and rigid regions, where the rigid regions can be made of standard, rigid PCB materials with connections to the flexible portions of the overall PCB. Standard via connections and holes are possible with flexible PCBs.

The combination of physically small, surface-mountable microphone devices on flexible PCBs enables the building of microphone arrays containing multiple microphone elements that can have geometries that are interesting for beamforming. One can build relatively large arrays of microphone devices that are stable in position and connected in unique ways.

Directional Microphone Arrays As audio communication devices find their way more and more into mobile applications, the ability to operate in the presence of high levels of background noise becomes more and more significant. Standard, single-channel, noise-suppression algorithms can be effective in combating undesired background noise, but these algorithms notoriously “fall off a cliff” in terms of signal quality as the signal-to-noise ratio (SNR) falls below about 5 dB. One proven effective way to further improve noise rejection and immunity is to use beamforming with multiple microphone devices. Beamforming is a linear process where noise rejection is accomplished by combining the signals from multiple microphone devices to attain a directional spatial response aimed at the desired source or desired spatially separated sources. Steering of the beamformer can be either mechanical or electrical.

As the size of microphone devices becomes smaller, the physical thermal-noise limit becomes more significant in terms of the dominant self noise of the microphone devices. One way to effectively deal with the loss in SNR for smaller devices is to combine them by summing many microphone devices to form a new microphone signal. Since thermal noise is independent between the microphone devices, the net gain in SNR by summing the signals is approximately 10*log(N), where N is the number of devices uniformly summed. One can also sum the devices with general weighting and sacrifice some SNR gain for spatial control of the composite microphone array. For instance, one could amplitude weight the device signals with a smooth aperture weighting to control sidelobe-level response at frequencies at and above the frequency where the wavelength becomes smaller than the size of the composite microphone array. Spatial smoothing by summing the signals from smaller microphone devices can be useful in beamforming systems where the average spacing of the microphone devices becomes larger than one half of the acoustic wavelength.

Figure 1B:
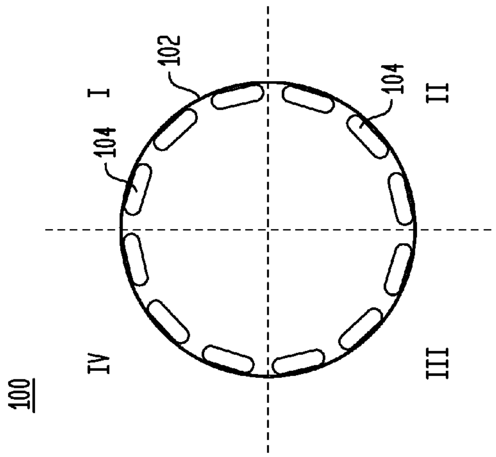
Figure 1C:
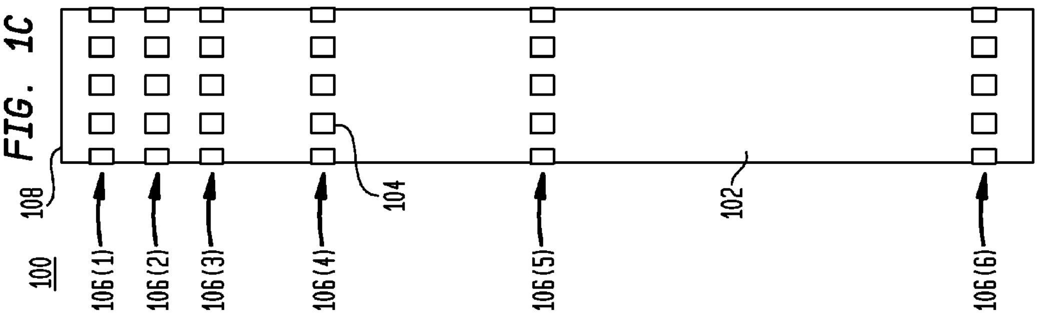

FIG. 1 shows a six-element microphone array 100 comprising a flexible PCB 102 and a plurality of surface-mounted microphone devices 104 arranged for form six microphone elements 106(1)-106(6). In particular, FIG. 1(A) shows a plan view of flexible PCB 102 in an unrolled (i.e., flat) state with the different microphone devices 104 arranged in six rows, each row corresponding to a different microphone element 106. FIG. 1(B) shows an end-fire view of microphone array 100 with flexible PCB 102 in a rolled-up, cylindrical state in which microphone elements 106 are on the interior surface of the cylinder formed by the rolled-up PCB. FIG. 1(C) shows an "X-ray" side view of microphone array 100 with flexible PCB 102 in the rolled-up state of FIG. 1(B), in which microphone elements 106 on the interior surface are visible in the X-ray view.

As used in this specification, the term "microphone device" refers to an individual transducer that converts acoustic vibrations into electrical signals, such as a single MEMS or electret microphone. The terms "microphone array" and "microphone" refer to an entire system of microphone devices whose electrical signals are combined to generate a single, electrical, array output signal. The term "microphone element" refers to a subset or cluster of two or more of the microphone devices in a microphone array that have a common geometric attribute in the array. For example, in microphone array 100, the 12 microphone devices 104 in each of the six microphone elements 106(1)-106(6) have substantially the same longitudinal distance from one end (e.g., end 108) of cylindrical microphone array 100.

Depending on the implementation, the process of rolling up flexible PCB 102 can be performed using a cylindrical object that might remain within the interior of microphone array 100 or be removed after flexible PCB 102 has achieved the desired, rolled-up shape. Depending on the implementation, each microphone device 104 can be surface mounted onto flexible PCB 102 as a top-ported device in which the device's aperture faces away from the surface of the PCB or as a bottom-ported device in which the device's aperture faces down into an opening in the PCB.

Note that, in an alternative embodiment, flexible PCB 102 can be rolled up in the opposite direction such that microphone elements 106 are on the exterior surface of the resulting cylinder. In another alternative embodiment, flexible PCB 102 can be rolled up at an angle such that the rows of devices form (interior or exterior) spiral stripes as on a barber-shop pole. Such a spiral construction could provide a better mechanical configuration in that it may be easier to spiral around a cylindrical object rather than just wrapping the rectangular, flexible PCB around one dimension of the array.

In the rolled-up state of FIGS. 1(B)-(C), microphone array 100 is a six-element end-fire linear array intended to operate as a wide-band second-order differential microphone. In one possible implementation, the longitudinal spacing between elements 106(1) and 106(2) and between elements 106(2) and 106(3) is about 1 cm, the longitudinal spacing between elements 106(3) and 106(4) is about 2 cm, the longitudinal spacing between elements 106(4) and 106(5) is about 4 cm, and the longitudinal spacing between elements 106(5) and 106(6) is about 8 cm. In addition, the lateral spacing between devices 104 within each element 106 is also about 1 cm.

The distances between the different elements 106 in FIG. 1 are selected to enable microphone array 100 to function as any of four different three-element arrays, where the three elements in each array are equally spaced. In particular, a first three-element array can be formed by combining the element output signals from only elements 106(1), 106(2), and 106(3), which are separated by 1 cm. A second three-element array can be formed by combining the element output signals from only elements 106(1), 106(3), and 106(4), which are separated by 2 cm. A third three-element array can be formed by combining the element output signals from only elements 106(1), 106(4), and 106(5), which are separated by 4 cm. Lastly, a fourth three-element array can be formed by combining the element output signals from only elements 106(1), 106(5), and 106(6), which are separated by 8 cm. For each of these four different three-element arrays, the frequency range of operation is less than the wavelength of sound in that frequency range. The first array having the closest-spaced elements covers the highest-frequency band of operation, while the fourth array having the widest-spaced elements handles the lowest-frequency band of operation. In alternative embodiments, more microphone elements can be added if a wider-frequency band of operation is desired or if a higher order for the differential array is desired.

In general, the 12 electrical signals from the 12 microphone devices 104 in each microphone element 106 are combined (e.g., summed) to form an element output signal. The six different element output signals are then combined (e.g., as a weighted sum) to form the array output signal. Depending on the particular application, the weight applied to one or more of the element output signals may be zero to remove those one or more elements from contributing to the resulting array output signal.

Summing (passively or digitally) the 12 microphone devices 104 in each element 106 yields a gain in signal-to-noise ratio (SNR) of approximately 11 dB. For example, if each device 104 has an equivalent self noise (ENL) of 25 dBA, then the ENL of the corresponding microphone element 106 would be 14 dBA. A microphone element having an ENL of less than 20 dBA is considered to be a low-noise element. Even better SNR can be achieved by employing more than 12 microphone devices for each element. However, since the SNR gain is proportional to the logarithm of the number of summed devices, the cost of adding more devices tends to grow more rapidly than the improvement in SNR. Low self-noise microphone devices can be chosen to control the number of devices in each element.

In an alternative scheme, the different microphone devices 104 in each element 106 can be segmented in the angular domain to form different sub-elements. For example, the three devices 104 in quadrant I of FIG. 1(B) can be summed to form a first sub-element signal for the corresponding element 106. Similarly, the set of three devices 104 in each of the three other quadrants can be summed to form a different sub-element signal for the corresponding element 106. This type of segregation could be useful for processing the incoming sound field to detect wind and associated wind-noise or near-field position of the sound source. It might also be feasible to adaptively linearly combine the segments to minimize wind-induced noise by using a wavenumber-frequency decomposition and filtering of the densely packed microphone devices or sub-elements of microphone devices. Frequency-wavenumber decomposition, either with a large number of devices or a smaller subset of devices, could also be used to determine the current SNR of the array and be used in dynamic noise suppression by dynamic temporal filtering controlled by the frequency-wavenumber domain data.

In alternative schemes, different sub-elements within an element can overlap, where the output from a given microphone device contributes to two (or more) different (e.g., adjacent) sub-elements.

In general, summing multiple device output signals to form sub-element and/or element output signals can be effective in combating the problem of spatial aliasing by lowering the response to signals arriving from the end-fire direction where spatial aliasing first appears.

FIG. 2 shows a two-element microphone array 200 comprising a flexible PCB 202 and a plurality of surface-mounted microphone devices 204 arranged for form two microphone elements 206(1) and 206(2). In particular, FIG. 2(A) shows a plan view of flexible PCB 202 in an unrolled (i.e., flat) state with the different microphone devices 204 arranged in two rows, each row corresponding to a different microphone element 206. FIG. 2(B) shows an end-fire view of microphone array 200 with flexible PCB 202 in a rolled-up, spiral state in which microphone elements 206 (not shown in FIG. 2(B) are on the outer surface of the spiral formed by the rolled-up PCB. FIG. 2(C) shows a side view of microphone array 200 with flexible PCB 202 in the rolled-up state of FIG. 2(B), in which microphone elements 206 on the outer surface are visible in the side view. In addition to the surface-mounted microphone devices 204, flexible PCB 202 has a number of openings 208 adjacent each row of devices. The purpose of these openings is described further below. FIG. 2(D) shows a three-dimensional perspective view of microphone array 200 with flexible PCB 202 in the rolled-up state of FIG. 2(B), in which the microphone devices 204 and openings 208 are not depicted.

The spiral configuration of FIG. 2 enables more microphone devices to be used to form the composite array output signal in a relatively compact arrangement. Many microphone devices can be held in place both radially as well as axially in a relatively small volume. For professional microphone applications, it is desired to construct extremely low self-noise microphones. Thus, there is the need to attain very-low ENL performance for professional microphones with the concomitant need for more individual, smaller microphone devices to attain a low-noise composite signal.

As designers and users demand more spatial directivity in small packages, higher spatial directivity can be attained by using superdirectional beamforming. Superdirectional beamforming is based on attaining higher differential orders of the scalar pressure field. Spatial derivatives of plane-wave fields have responses that are high-pass functions with a slope proportional to the order of the differential. Signals processed through a superdirectional beamformer subtract, and the SNR on output can be much less than the input SNR. A standard measure of the loss in SNR in beamforming is the White-Noise-Gain (WNG). Negative WNG indicates that there is a loss in SNR. Positive WNG indicates that the beamformer output SNR is higher than a single microphone input SNR. Positive WNG is typical in classical delay-sum beamformers, which generally employ an additive combination of the array elements. Thus, a designer utilizing superdirectional beamforming should use the lowest-ENL microphone devices that can be obtained within cost constraints. Combining smaller, inexpensive microphone devices using a cluster-element construction is one cost-effective way for a designer to optimize the performance of the overall design and meet design specifications.

One can also use microphone array 200 of FIG. 2 in a flat, broadside array design where the two elements 206(1) and 206(2) are processed as a dual-element, first-order design, where the elements are steered using either delay-sum beamforming or a more-general, filter-sum beamformer that can be optimized in terms of maximizing directional gain under WNG and spatial constraints.

As described previously, flexible PCB 202 of microphone array 200 is perforated to form a number of openings 208. There may be some advantages to "open" the flexible PCB by placing such cutouts or perforations in as many places as possible while maintaining structural integrity and circuit connectivity. By opening up the flexible PCB, one can make the system more acoustically transparent, which might help in limiting the potential negative impact of package size and the commensurate issues of scattering and diffraction.

In FIG. 2, the 20 microphone devices 204 in each element 206 are evenly spaced within the corresponding row. In order to achieve or even approach the minimum bending radius of a flexible PCB near the center of a spiral configuration, such as that shown in FIG. 2(*b*), the microphone devices located near that center may need to be more sparsely distributed on that portion of the flexible PCB than on the other portions associated with greater bending radii. As a result, the two-dimensional density of the microphone devices, as viewed from the end-fire direction (as in FIG. 2(B)), would tend to increase as the radial position increases. The net effect on the array output with this unequal density is to apply more weight to the acoustic pressure on the outer position of the microphone array.

In the field of general linear acoustics, the far-field beampattern and the aperture weighting function of a beamformer are directly related by the Fourier Transform. The beampattern of the overall microphone array can be controlled by controlling the actual density (by physical design) or the effective density (by weighted summing) of the microphone devices. For instance, one could space the devices 204 in each row of FIG. 2(A) so that the overall average weighting function of the beamformer was Gaussian in shape (i.e., peaked at the end-fire center of the array and falling off with increasing radial distance from the center). This could be accomplished as either a change in the spacing of the microphone devices or in how the flexible array was physically folded, rolled, or formed. A Gaussian weighting function is interesting in that the Fourier transform is also Gaussian. Thus, one could have a diffraction beampattern for the individual microphone elements 206 that would not have any sidelobes. An exponential distribution (where the density fell off exponentially as a function of radius) would also result in a sidelobe-free diffraction directivity pattern.

Figure 2A:
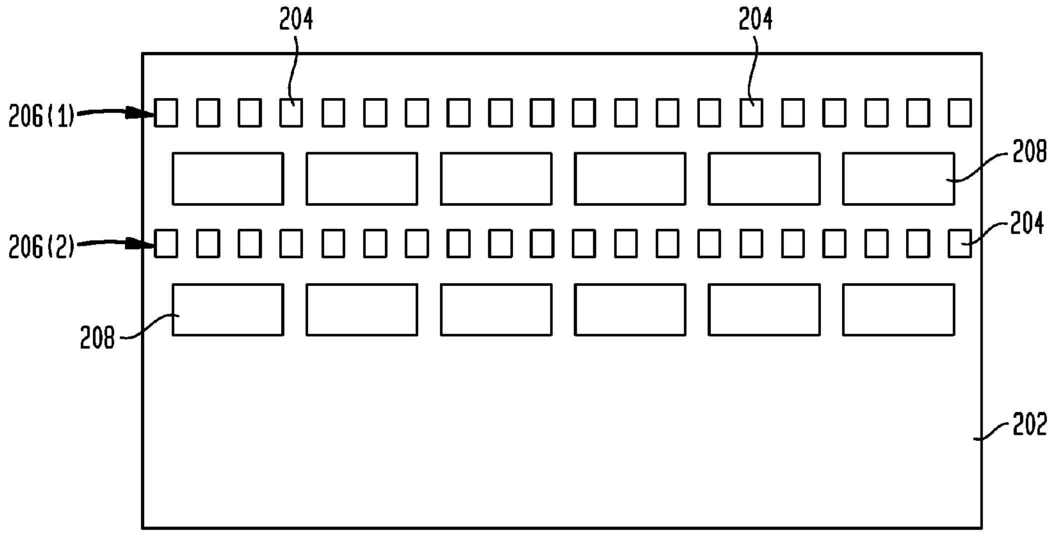
FIG. 2 shows a two-element, spiral microphone array comprising a flexible PCB and a plurality of surface-mounted microphone devices arranged for form two microphone elements.
Figure 2B:
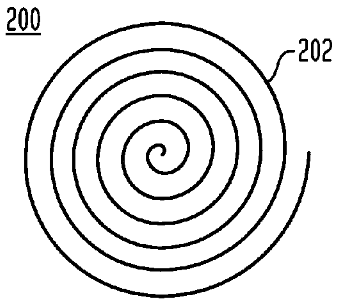
Figure 2C:
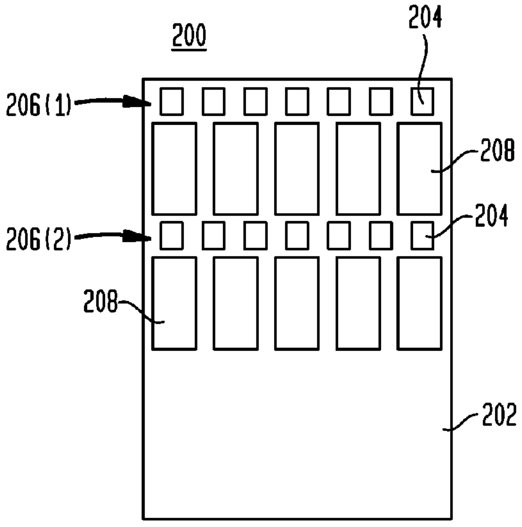
Figure 2D:
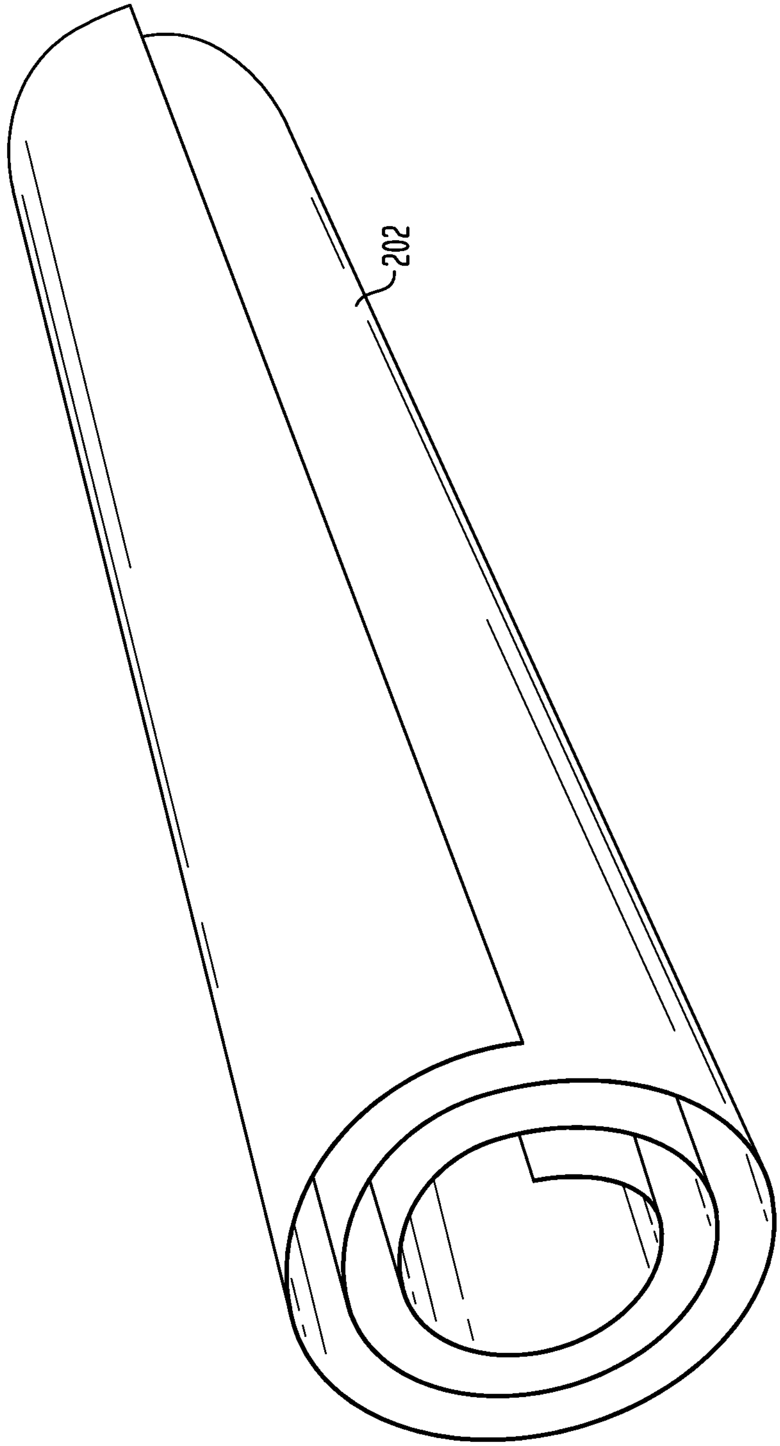

One could have further flexibility by forming separate sub-element outputs corresponding to different radial positions (e.g., "rings") of the spiral configuration of FIG. 2(B). For example, the innermost (i.e., small radial position) devices 204 in each spiral element 206 could be summed to form a first sub-element output signal, while the remaining, outermost (i.e., large radial position) devices 204 could be summed to form a second sub-element output signal. By having different annular segments corresponding to two (or more) different sub-elements of each spiral element 206, one could control the beampattern at higher frequencies (where the wavelength becomes on the scale of the diameter of the sub-element). Thus, one could selectively use smaller and smaller inner radial sub-elements as the frequency increases to control how narrow the beampattern becomes.

Yet another possible embodiment involves widening the dynamic range of microphone array 200 by using different dynamic-range microphone devices 204 within each microphone element 206. A sub-element of each element 206 can then be populated by a number of microphone devices 204 that have much-stiffer compliance characteristics resulting in a lower sensitivity but an ability to operate at much-higher sound-pressure levels. One can dynamically switch over to an overall array formed from just these sub-elements as the sound-pressure level increases above the linear operating range of the rest of the microphone devices and not use these sub-elements at lower sound-pressure level signals. Although the inherent SNR of the higher-sound-pressure-level microphone devices is worse, transitioning over to these lower-SNR devices would not be audible, since masking in human hearing would prevent one from perceiving the higher noise due to the higher signal level. The transition between these two types of microphone arrays can be done continuously over a wide range in sound level. One could also expand on this idea by building more sub-elements that have different maximum sound-pressure levels and dynamically switching between these sub-elements to maintain desired linearity over a desired wide dynamic range.

Another possible configuration similar to the dynamic-range-increase concept is to use two or more sub-elements of microphone devices with different low-frequency cutoff frequencies. Acoustic pressure-sensing microphone devices use an atmospheric leak to the rear volume of the device to mitigate the problem of sensitivity change with atmospheric pressure changes. The resulting high-pass response is controlled by the size of the leak and the size of the back volume. Thus, by adjusting the leak size, one can control the high-pass cutoff frequency of the microphone device. Current MEMS microphone devices can control the size of this leak and therefore accurately control the high-pass cutoff frequency. Wind noise contains very large acoustic-pressure fluctuations at low frequencies. As a result, microphones (and especially differential directional microphones) are susceptible to both low-frequency electrical and acoustic overload in wind. One way to combat the overload is to use microphone devices that naturally have a mechanical high-pass response so that the high level of low-frequency wind excitation is acoustically short-circuited by the atmospheric leak. The advantage of having a larger vent leak is that the mechanical motion of the microphone diaphragm can be greatly reduced and therefore can significantly reduce wind-induced overload in the microphone device. A disadvantage of having a permanent, higher-frequency, high-pass cutoff is that, for no air flow, desired acoustic low frequencies are attenuated. By combining two or more microphone devices with different cutoffs, one could dynamically transition to using the best set of microphone devices for the current conditions, e.g., wide-band when there is no wind or more high-passed when the wide-band microphone devices are overloaded by wind and air flow over the devices.

Although FIG. 2 has been shown with only two elements 206, it will be understood that alternative microphone arrays can have more than two such elements.

Although microphone arrays have been discussed that have microphone devices mounted on only one side of the flexible PCB, in alternative embodiments, devices can be mounted on both sides of the flexible PCB. If one adds the output signals from devices on both PCB sides, then the vibration induced and acoustic coupling due to the acoustic radiation from the vibration of the PCB will subtract (due to the 180-degree flip in phase), but the desired acoustic-pressure signal will sum. Thus, by this technique, one could remove undesired vibration signals from the microphone output, even for extremely complex vibration of the PCB.

Figure 3:
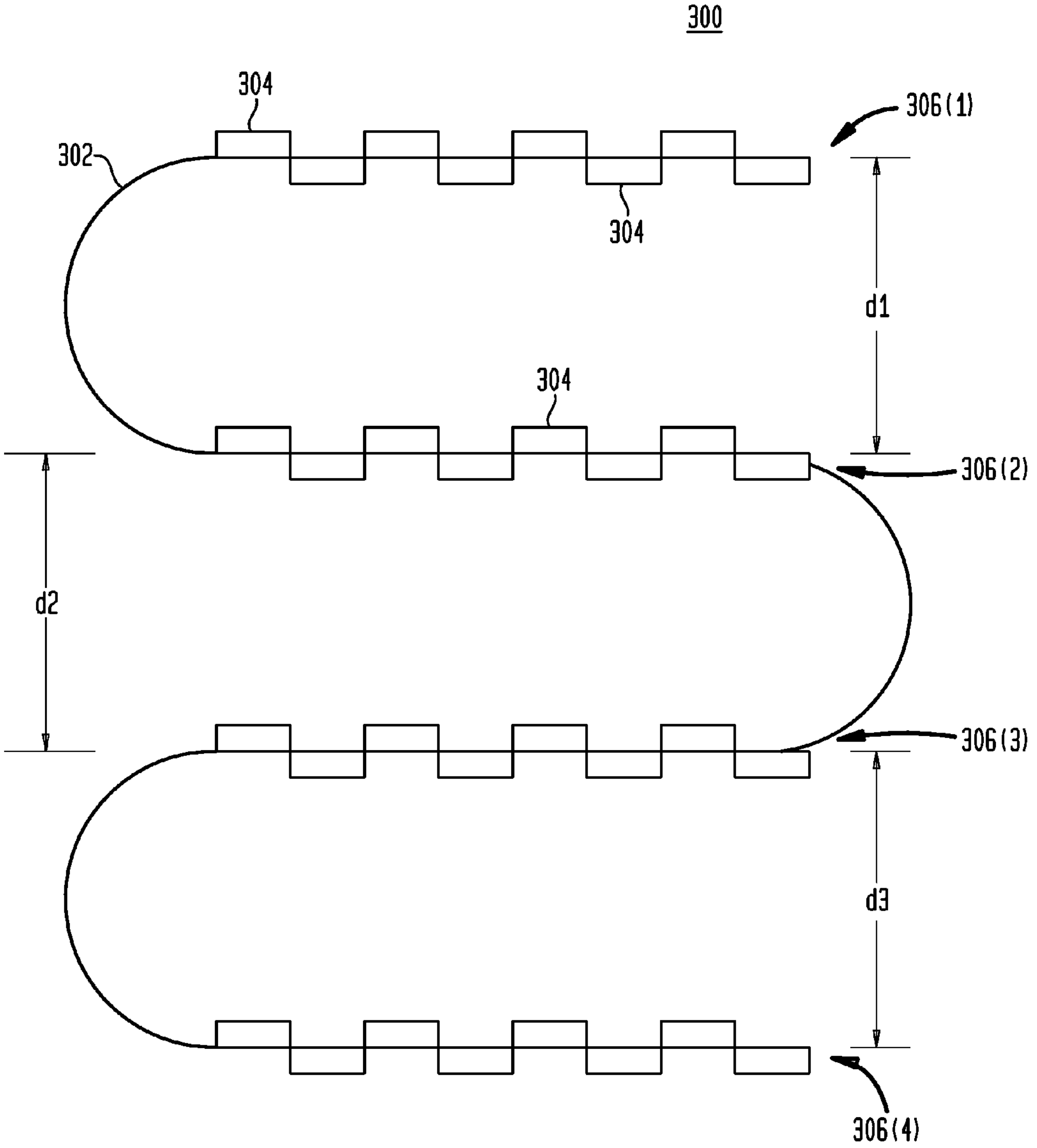
FIG. 3 shows an end-fire view of a microphone array in which a flexible PCB (i) has microphone devices mounted on both sides and (ii) is configured in a serpentine configuration.

FIG. 3 shows an end-fire view of a microphone array 300 in which a flexible PCB 300 (i) has microphone devices 304 mounted on both sides and (ii) is configured in a serpentine configuration. As shown in FIG. 3, devices 304 are mounted on the relatively flat (and possibly rigid) portions of flexible PCB 300. In this way, vibration coupling can be further lowered by using the bending compliance of the curved portions of the flexible PCB to mechanically isolate the flat portions of the flexible PCB. One could continue to further increase the overall compliance by using multiple, bending turns in the flexible PCB or by adding mass to the flat portions that contain the microphone devices. Other schemes like mass loading a section of the flexible PCB that is coupled to the main structure holding the microphone array through thin connecting members to the mass-loaded section can also be used to isolate vibration from the main acoustic-sensing part of the microphone array.

The geometry shown in FIG. 3 can also be used to build a differential microphone array with the different planes corresponding to different microphone elements formed from different sets of closely-spaced microphone devices. Thus, the eight microphone devices 304 in the uppermost plane in FIG. 3 would form a first microphone element 306(1) Similarly, the three different sets of eight microphone devices 304 in the other three planes in FIG. 3 would form three other microphone elements 306(2), 306(3), and 306(4). The directivity of the resulting differential array would maximize along the direction normal to the planes that define the elements. Depending on the particular embodiment, the spacings d1, d2, and d3 can be the same or different. More or fewer turns could be used as well if one wanted to build higher-order arrays or a segmented array where different planes are used for different frequency ranges. The flexible PCB could be perforated so that sound could propagate through the planar sheets with little to no attenuation or perturbation to the sound.

Microphone devices can be even more densely configured by mounting devices in a staggered manner (similar to that represented in FIG. 3) onto opposite sides of the flexible PCB closer to one another in the lateral direction than would be possible if the devices were mounted side-by-side onto a single side of the flexible PCB.

Although FIGS. 1, 2, and 3 respectively show cylindrical, spiral, and serpentine configurations of the flexible PCB, other configurations are also possible, where the flexible PCB can be conformed to the shapes of existing objects having other geometries. For example, a flexible PCB can be mounted onto the surface of a cube or other, general surface that can be approximated by flat, polygonal segments. A least-squares-constrained, optimal beamformer design can be obtained either by a closed-form, matrix-inverse solution from the known conformal geometry or by measurements of the impulse responses of the array from many discrete angles of incidence. The number of discrete measurement angles is determined by the desired numerical accuracy and condition number for the matrix inversion that is required to obtain the possibly constrained, optimum beamformer weights from the measured, spatial impulse responses.

As described previously, the output signals from different subsets of microphone devices can be combined (e.g., summed in analog or digital) to form element output signals corresponding to different microphone elements, and the element output signals can then be combined (e.g., by weighted summation) into a single, composite, array output signal for the overall microphone array. Such summing and/or weighted summation can be performed using summing op-amp circuits (not shown) that are also mounted onto the flexible PCB. In addition, analog-to-digital (A/D) converters can be placed close to the microphone devices to improve EMI performance of the microphone array. Passive or digital combining of the device output signals allows one to route only the resulting element output signals for further (either on-board or off-board) processing. Digitizing near the devices allows one to place the digital, element output signals onto a time-division multiplexed (TDM) bus. Some common A/D codecs allow “daisy-chaining” of the codecs which would allow a single, digital serial bus to contain all of the composite element output signals. The codecs could be distributed on the flexible PCB near the devices while sharing the common serial bus. Other types of electronic devices, such as (without limitation) ASICs, FPGAs, and/or DSPs can also be mounted onto the flexible PCB to process signals generated by the different microphone devices, sub-elements, and/or elements.

Relatively inexpensive, digital, surface-mount microphone devices are becoming available. First-generation devices use a pulse-density modulated (PDM) data stream running at a few megahertz capable of sharing two channels of audio in the serial interface. Interestingly, a PDM serial bit-stream can also be used to perform the element summation of the microphone devices in the digital bit domain. The resulting digital, element output signal is then fed as a single PDM stream or an Integrated Interchip Sound (I2S) output TDM stream to other devices for further processing. Processing in the PDM domain could potentially lower the individual cost of the surface-mount microphone devices.

Downsampling (decimating) the PDM digital stream is trivial for some input codecs since the PDM signal is a standard operation for the front-end of modern delta-sigma converters. Since the bit-serial data stream is at a relatively high rate, downsampling the data stream can be handled by FPGA processing, which converts the high bit-rate serial stream into a lower bit-rate serial stream for a standard DSP chip. DSP chipsets used for audio signal processing use a more-flexible I2S serial interface that supports multiple simultaneous channels of digital audio. Manufacturers of digital surface-mount microphone devices are now beginning to design devices with I2S output, thereby making microphone arrays with more than two microphone devices more simple to build. External chips would be used to frame the multichannel digital stream for DSP serial input. Future microphone-interface designs may allow “daisy chaining” of the digital stream to enable lower-cost microphone-array applications. Although the digital data rate used to transmit all device output signals is higher than the composite analog element output signals described earlier, having individual output signals from each microphone device would enable more-dynamic and more-flexible grouping of the microphone devices into elements and sub-elements.

Polyhedral Arrays Formed Using Flexible PCBs

The microphone arrays of FIGS. 1, 2, and 3 form two-dimensional linear microphone arrays when viewed from the end-fire direction. Three-dimensional (3D) polyhedral microphone arrays can also be made using flexible PCBs having rigid sections interconnected by flexible regions. Each polyhedron is made of planar polygon sections. Flexible PCB construction is well suited to building polyhedra since flexible PCBs are often laminated to rigid PCB material. Segmenting the rigid sections between flexible regions can allow a single PCB to be formed into a 3D polyhedral shape.

Figure 4A:
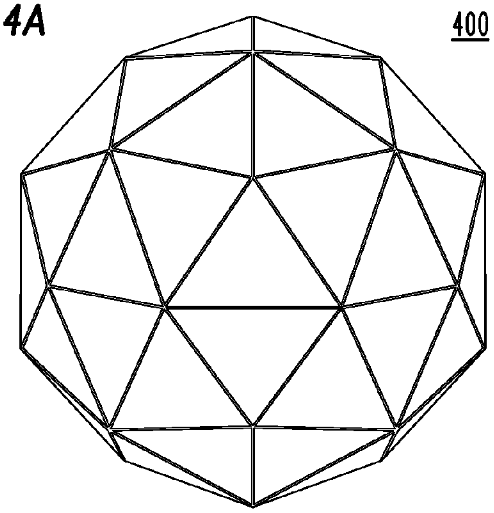
Figure 4B:
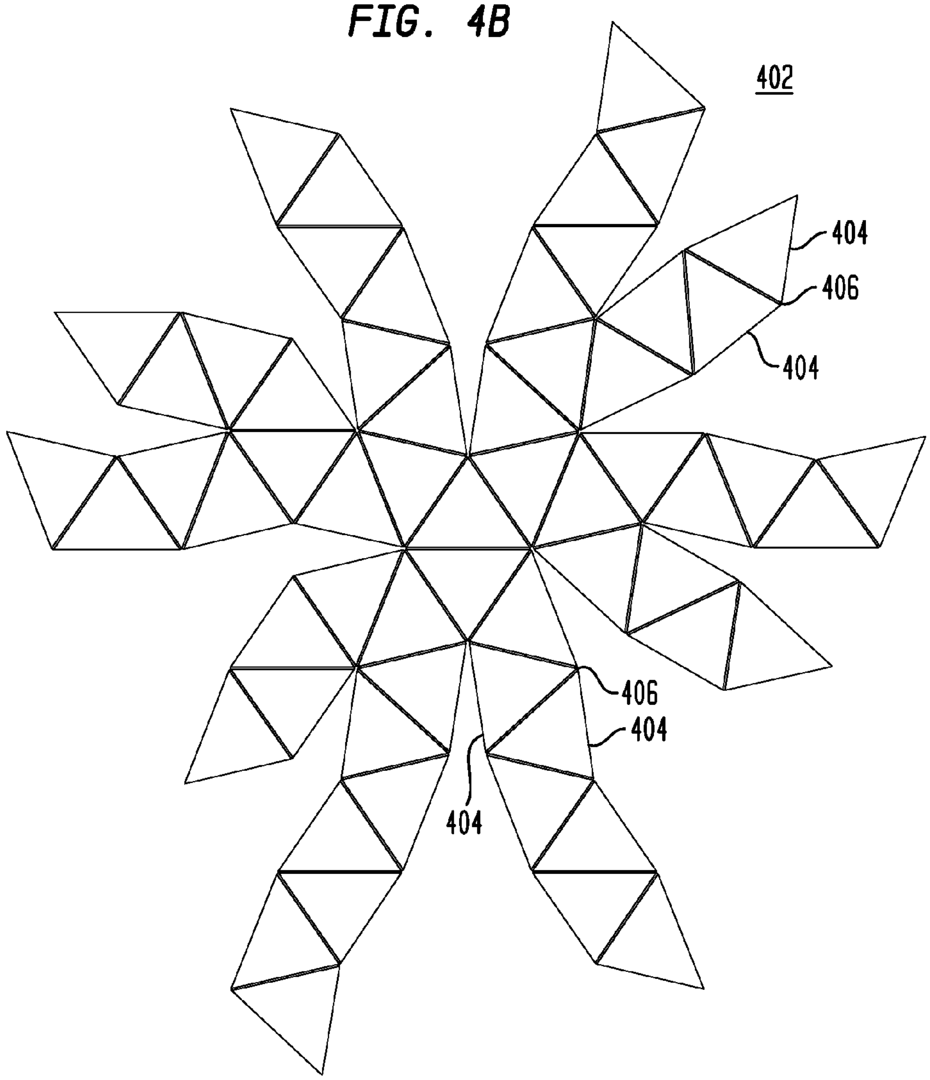
FIG. 4(B) shows a plan view of a flexible PCB corresponding to a planar segmentation of a 60-sided Pentakis Dodecahedron that can be used to make the 3D microphone array of FIG. 4(A)

FIG. 4(A) shows a perspective view of a 3D microphone array 400 having the polyhedral shape of a 60-sided Pentakis Dodecahedron. FIG. 4(B) shows a plan view of a flexible PCB 402 corresponding to a planar segmentation of a 60-sided Pentakis Dodecahedron that can be used to make 3D microphone array 400 of FIG. 4(A). Flexible PCB 402 has 60 rigid, triangular PCB sections 404 interconnected by flexible, linear PCB regions 406 that can be bent to configure the rigid sections to be angled with respect to one another. 3D microphone array 400 of FIG. 4(A) can be formed by bending flexible PCB 402 along each flexible, linear PCB region 406 to achieve a uniform dihedral angle of about 156 degrees.

Although not shown in the figures, flexible PCB 402 of FIG. 4(B), and therefore 3D microphone array 400 of FIG. 4(A), has a plurality of individual, surface-mounted microphone devices, analogous to devices 104, 204, and 304 of FIGS. 1, 2, and 3, respectively, distributed around and mounted onto the different rigid, triangular PCB sections 404, where zero, one, or more devices are mounted onto each different triangular PCB section 404. Depending on the particular implementation, the devices may be distributed uniformly or non-uniformly around the polyhedron with each triangular PCB section 404 having the same number of devices or different triangular PCB sections 404 having different numbers of devices, including some triangular PCB sections 404 having no devices.

In this way, 3D microphone array 400 can be used to implement a spherical Eigenmike® microphone array, such as those described in U.S. Pat. No. 7,587,054 (Elko et al.), the teachings of which are incorporated herein by reference. Every triangular face can be further subdivided into subsections so that smaller clusters of microphone devices can be combined to allow more flexibility in combining clusters to achieve spatial low-pass filtering and combat spatial-aliasing effects at high frequencies. Smaller cluster combinations allow control of the spatial response at frequencies using filter-sum beamforming where the impact of spatial aliasing precludes the use of Eigenbeam-forming.

Note that flexible PCBs corresponding to planar segmentations of a Pentakis dodecahedron different from that shown in FIG. 4(B) can be used to make 3D microphone array 400 of FIG. 4(A). Note, further, that flexible PCBs corresponding to planar segmentations of polyhedral shapes other than a Pentakis dodecahedron can be used to make 3D microphone arrays having other polyhedral shapes. For example, a flexible PCB corresponding to a planar segmentation of a cube having 6 rigid, square PCB sections interconnected by flexible, linear PCB regions can be used to make a 3D microphone array having a cubic shape. Another example would be a flexible PCB corresponding to a planar segmentation of a regular dodecahedron having 12 rigid, equilateral pentagonal PCB sections interconnected by flexible, linear PCB regions can be used to make a 3D microphone array having a regular dodecahedral shape. Yet another example would be a flexible PCB corresponding to a planar segmentation of a regular icosahedron having 20 rigid, equilateral triangular PCB sections interconnected by flexible, linear PCB regions can be used to make a 3D microphone array having a regular icosahedral shape. Those skilled in the art will understand that other regular polyhedral shapes are possible based on flexible PCBs corresponding to appropriate planar segmentations.

Modular Construction of Microphone Array Assemblies

Building a complete microphone array from one flexible PCB enables all electrical connections to be made on a single PCB. There may, however, be advantages in providing microphone sub-arrays that can be connected to form larger, more-complex microphone array assemblies. One way to visualize these smaller sub-arrays is to think of them as pieces of a two- or even three-dimensional puzzle. Depending on the implementation, the sub-arrays could all have the same shape or different sub-arrays could have different shapes. Providing different sub-arrays with different shapes would enable even more-complex structures to be built. In any case, the sub-arrays would be constructed as modules that physically interlock with one another like pieces of a puzzle.

Figure 5:
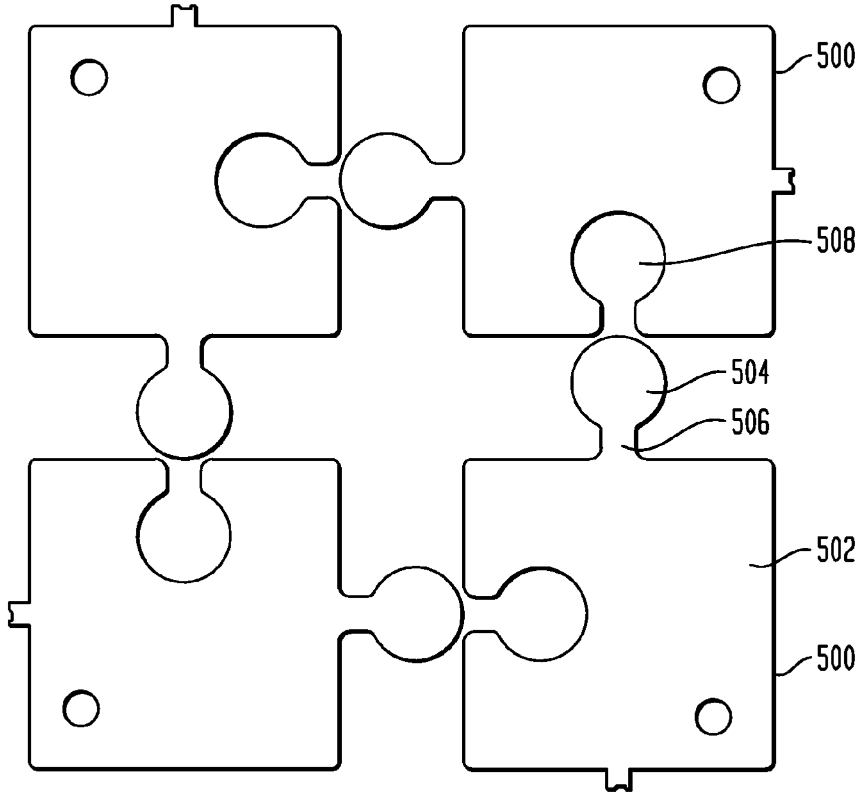
FIG. 5 shows a plan view of four microphone sub-arrays having the same, roughly square shape.

FIG. 5 shows a plan view of four microphone sub-arrays 500 having the same, roughly square shape. In this particular case, each sub-array 500 has two rigid PCB sections (i.e., a rigid, square PCB section 502 and a rigid, circular PCB section 504) interconnected by a flexible region 506. Each rigid, square PCB section 502 has a cut-out portion 508 corresponding to the shape of the rigid, circular PCB section 504 and its corresponding flexible region 506, such that two sub-arrays 500 can be connected together by inserting the rigid, circular PCB section 504 and the flexible region 506 of one sub-array 500 into the cut-out portion 508 of the other sub-array 500. Additional sub-arrays 500 can be added in an analogous manner. As suggested in FIG. 5, the four microphone sub-arrays 500 can be connected together to form a larger, square microphone array assembly. Moreover, one or more of the flexible regions 506 can be bent to give the resulting microphone array assembly a 3D shape.

Depending on the implementation, the different sub-arrays 500 could have electrical contacts at their edges that would allow electrical signals to flow between interconnected sub-arrays whose electrical contacts are mated with one another. In one implementation, the electrical contacts are at the edges of the rigid, circular PCB sections 504 and at corresponding locations at the edges of the cut-out portions 508. In this way, common electrical signals, such as power and ground, and even locally generated signals could flow between the interconnected sub-arrays.

Figure 6:
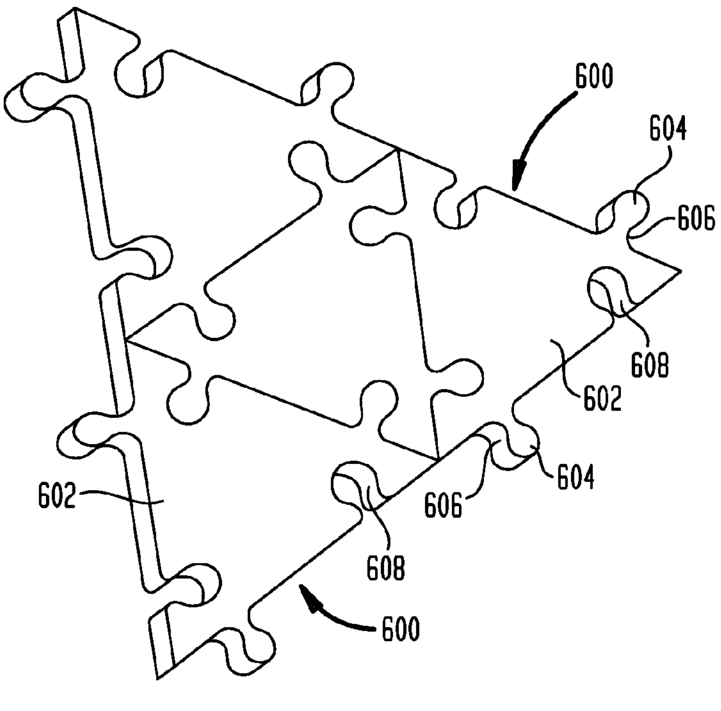
FIG. 6 shows a perspective view of four microphone sub-arrays having the same, roughly triangular shape.

FIG. 6 shows a perspective view of four microphone sub-arrays 600 having the same, roughly triangular shape. In this particular case, each sub-array 600 has four rigid PCB sections (i.e., a rigid, triangular PCB section 602 and three rigid, circular PCB sections 604) interconnected by three flexible regions 606. Each rigid, triangular PCB section 602 has three cut-out portions 608, each corresponding to the shape of a rigid, circular PCB section 604 and its corresponding flexible region 606, such that two (or more) sub-arrays 600 can be connected together by inserting a rigid, circular PCB section 604 and its corresponding flexible region 606 of one sub-array 600 into the corresponding cut-out portion 608 of the other sub-array 600. As suggested in FIG. 6, the four microphone sub-arrays 600 can be connected together to form a larger, triangular microphone array assembly.

Analogous to FIG. 5, different corresponding pairs of the flexible regions 606 can be bent to give the microphone array assembly a 3D shape, where each corresponding pair includes, for two interconnected sub-arrays 600, the one flexible region 606 from each sub-array along their abutting edges. For example, a regular icosahedral microphone array assembly analogous to the one described in the previous section can be constructed by appropriately interconnecting and bending the flexible regions 606 of 20 different instances of sub-array 600 of FIG. 6.

In addition to the roughly square and triangular shapes represented in FIGS. 5 and 6, sub-arrays having other shapes, such as (without limitation) pentagons and hexagons, could also be made. Although this interlocking has been described in the context of sub-arrays having multiple rigid PCB sections interconnected by flexible PCB regions, where a rigid PCB section and a corresponding flexible PCB region of one sub-array fits within a cut-out portion of another sub-array, interlocking can also be implemented in other contexts. For example, interlocking could involve one or both sub-arrays being entirely flexible. Interlocking could also involve one of the sub-arrays being entirely rigid, as long as the other sub-array is at least partially flexible.

Instead of different sub-arrays having interlocking members, as in FIGS. 5 and 6, in alternative embodiments, different sub-arrays could have overlapping members that mate with one another. For example, in FIG. 5, instead of having cut-out portions 508, the circular (or other shaped) PCB section 504 of one sub-array 500 could overlap a non-cut-out portion of the square PCB section 502 of another sub-array 500, where the circular PCB section 504 would have electrical connectors that would mate with corresponding electrical connectors on the square PCB section 502 to enable signals to be transmitted between sub-arrays. Overlapping the sub-arrays could simplify the electrical connection of multiple sub-arrays into a larger array. The sub-arrays would still have the functional equivalent of flexible regions 506 in order to enable the resulting microphone array assembly to achieve a 3D shape.

Although this overlapping has been described in the context of sub-arrays having multiple rigid PCB sections interconnected by flexible PCB regions, where a rigid PCB section of one sub-array overlaps with a rigid PCB section of another sub-array, overlapping can also be implemented in other contexts. For example, one or both of the overlapping portions could be or could include one or more of the flexible PCB regions. Moreover, overlapping could involve one or both sub-arrays being entirely flexible. Overlapping could also involve one of the sub-arrays being entirely rigid, as long as the other sub-array is at least partially flexible.

Figure 7:
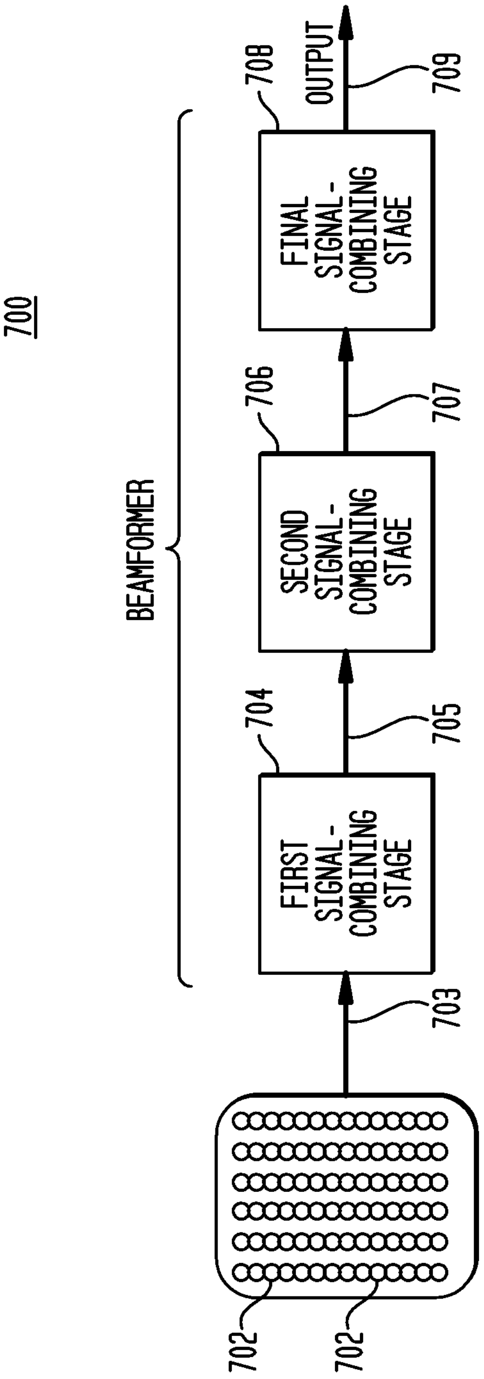
FIG. 7 shows a block diagram representing the signal processing of a generic microphone array having a flexible PCB with a plurality of surface-mounted microphone devices.

FIG. 7 shows a block diagram representing the signal processing of a generic microphone array 700 having a flexible PCB with a plurality of surface-mounted microphone devices 702. In this generic embodiment, the output signals 703 from different (possibly overlapping) sub-clusters of devices 702 are combined (e.g., summed) by a first signal-combining stage 704 to generate a plurality of sub-element signals 705, where each sub-element signal corresponds to a different sub-cluster of devices. The plurality of sub-element signals 705 are applied to a second signal-combining stage 706, which combines (e.g., by weighted summation) different (possibly overlapping) sets of sub-element signals 705 to generate a plurality of element signals 707, where each element signal corresponds to a different set of sub-element signals. Lastly, the plurality of element signals 707 are applied to a third (and final) signal-combining stage 708, which combines (e.g., by weighted summation) the plurality of element signals 707 to generate a single, composite, array output signal 709 for microphone array 700. Note that the three signal-combining stages can function as a beamformer.

Note that, in alternative embodiments, the first signal-combining stage 704 and/or the second signal-combining stage 706 may be omitted. Note further that, depending on the implementation, zero, one, or more of the initial signal-combining stages may be performed by devices (e.g., summing op-amp circuits) mounted on the flexible PCB, while the rest of the signal-combining stages (if any) are performed by one or more processors located external to the flexible PCB. Note further still that, depending on the implementation, the signal combination performed by one or more of the signal-combining stages may be weighted or unweighted signal differencing, instead of summation.

Acoustic Advantages to Using Flexible PCBs for Microphone Arrays

Although the basic microphone array structure is based on surface-mounted microphone devices on a flexible PCB, other types of electronic devices can also be incorporated on the flexible PCB, such as (without limitation) gyroscopes, accelerometers, cameras, vibration sensors, pressure sensors, capacitive sensors, temperature sensors, application-specific integrated circuits (ASICs), field-programmable gate arrays (FPGAs), complex programmable logic devices (CPLDs), digital signal processors (DSPs), and advanced RISC (reduced instruction set computer) machines (ARMs). For example, one could mount commonly available, small, single-axis or multi-axis accelerometers and/or gyroscopes. One could also add capacitive and/or pressure-sensitive sensors to the flexible PCB to detect how the device is being held and/or determine the distribution of force over the surface. Having small accelerometers that can be placed extremely close to the acoustic-sensing microphone devices on the flexible PCB would be advantageous since the sampling distance can be made very small.

Also, by using vibration, gyroscoping, and pressure and capacitive sensors, a user can dynamically change the operation of the microphone array by either vibration, orientation, or touch, where it would also be possible to use all of these sensors in parallel. Providing human "gesture" recognition as part of the microphone array, by using auxiliary sensors on the same flexible PCB, could open up many new modalities for microphone control such as near-field effect removal or enhancement, dynamic control of equalization, compression, effects processing, beampattern control, and similar modification of the microphones acoustic and electrical response. It might also be advantageous to detect undesired vibration and adaptively subtract out the undesired, coupled acoustic response due to the vibration. By allowing multiple mechanical sensing devices, it might also be possible to isolate specific types of undesired vibration energy that get into the acoustic or electrical response of the microphone.

With a large array of microphone devices distributed over a reasonable area, it is possible that the acoustic signals from clusters of devices can be used to determine how the array is being held. One can use this physical information to effect a modification on how the microphone operates. The general idea is to use acoustic information from the clusters of microphone devices to control the post-processing chain (like equalization, gain, proximity control, directivity control, or a preprogrammed change in operation, etc.). For example, it would be possible to turn the microphone array into a flute or some other musical instrument where touch is determined by many microphone devices that are used, along with acoustic excitation, for control and modification of dynamic signal generation.

As used in this specification, the terms "printed circuit board" and "PCB" are intended to refer generally to any structure used to mechanically support and electrically connect electronic components using conductive pathways, tracks, or signal traces etched from (e.g., copper) sheets laminated onto a non-conductive substrate. Synonyms for printed circuit boards include printed wiring boards and etched wiring boards.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range. It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A microphone array comprising:

a flexible printed circuit board (PCB);

a plurality of microphone devices mounted onto the flexible PCB, wherein each microphone device is an individual transducer adapted to convert acoustic vibrations into electrical signals; and one or more initial signal-combining stages adapted to combine device output signals from the plurality of microphone devices to generate a plurality of element output signals, wherein:

the flexible PCB provides electrical connections adapted to transfer the device output signals from the plurality of microphone devices to the one or more initial signal combining stages;

the microphone array has a three-dimensional (3D) shape: and the flexible PCB is bent to achieve the 3D shape.

2. The invention of claim 1, wherein at least two of the microphone devices have different dynamic ranges such that different microphone devices can be selected for different applications.

3. The invention of claim 1, wherein at least two of the microphone devices have different frequency responses such that different microphone devices can be selected for different applications.

4. The invention of claim 1, wherein the flexible PCB has at least two microphone devices mounted onto opposites sides of the flexible PCB.

5. The invention of claim 1, wherein the one or more initial signal-combining stages are adapted to perform weighted summation on the device output signals to generate at least one of the element output signals.

6. The invention of claim 1, wherein the one or more initial signal-combining stages comprise:

a first signal-combining stage adapted to combine the device output signals to generate a plurality of sub-element output signals; and a second signal-combining stage adapted to combine the sub-element output signals to generate the element output signals.

7. The invention of claim 6, wherein the device output signal from at least one microphone device is used to generate at least two different sub-element output signals corresponding to at least two different sub-elements of the microphone array.

8. The invention of claim 1, wherein the device output signal from at least one microphone device is used to generate at least two different element output signals corresponding to at least two different elements of the microphone array.

9. The invention of claim 1, further comprising a final signal-combining stage adapted to combine the plurality of element output signals to generate an array output signal for the microphone array.

10. The invention of claim 9, wherein the final signal-combining stage is adapted to perform weighted summation on the element output signals to generate the array output signal.

11. The invention of claim 9, wherein the one or more initial signal-combining stages and the final combining stage are all mounted onto the flexible PCB.

12. The invention of claim 1, wherein the microphone devices are arranged on the flexible PCB to form a plurality of microphone elements, each microphone element comprising one or more microphone devices.

13. The invention of claim 12, wherein:

the microphone devices are arranged on the flexible PCB in rows; and each microphone element corresponds to a different row of microphone devices.

14. The invention of claim 13, wherein:

a first set of the rows are separated by a first distance;

a second set of the rows are separated by a second distance different from the first distance; and the microphone array is adapted to:

combine element output signals corresponding to only the first set to form a first array output signal corresponding to a first frequency range of operation; and combine element output signals corresponding to only the second set to form a second array output signal corresponding to a second frequency range of operation different from the first range of operation.

15. The invention of claim 14, wherein:

a third set of the rows are separated by a third distance different from the first and second distances;

a fourth set of the rows are separated by a fourth distance different from the first, second, and third distances; and the microphone array is adapted to:

combine element output signals corresponding to only the third set to form a third array output signal corresponding to a third frequency range of operation different from the first and second ranges of operation; and combine element output signals corresponding to only the fourth set to form a fourth array output signal corresponding to a fourth frequency range of operation different from the first, second, and third ranges of operation.

16. The invention of claim 1, wherein the flexible PCB has one or more openings that facilitate sound reaching the microphone devices.

17. The invention of claim 1, wherein the microphone array further comprises one or more other electronic devices mounted onto the flexible PCB and adapted to process device output signals generated by the microphone devices.

18. The invention of claim 17, wherein the one or more other electronic devices comprise one or more of:

one or more analog-to-digital (A/D) converters adapted to digitize the device output signals;

one or more summing circuits adapted to combine the device output signals; and one or more gyroscopes, one or more accelerometers, one or more cameras, one or more vibration sensors, one or more pressure sensors, one or more capacitive sensors, one or more temperature sensors, one or more application-specific integrated circuits (ASICs), one or more field-programmable gate arrays (FPGAs), one or more complex programmable logic devices (CPLDs), one or more digital signal processors (DSPs), and one or more advanced RISC (reduced instruction set computer) machines (ARMs).

19. The invention of claim 1, wherein the 3D shape is a cylinder.

20. The invention of claim 1, wherein the 3D shape is a spiral.

21. The invention of claim 1, wherein the 3D shape is a serpentine.

22. The invention of claim 21, wherein:

the flexible PCB comprises a plurality of flat portions interconnected by one or more curved portions; and at least some of the microphone devices are mounted onto the plurality of flat portions.

23. The invention of claim 22, wherein at least one flat portion is mass-loaded to control vibrations of the at least one flat portion relative to at least one other flat portion.

24. The invention of claim 22, wherein at least one flat portion has at least two microphone devices mounted onto opposites sides of the flat portion.

25. The invention of claim 22, wherein the microphone array is adapted to:

(a) combine device output signals from microphone devices on each of at least two different flat portions to generate at least two corresponding element output signals; and (b) combine the at least two corresponding element output signals from the at least two different flat portions to generate an array output signal for the microphone array.

26. The invention of claim 25, wherein microphone array is adapted to generate the array output signal based on a difference between two element output signals.

27. The invention of claim 26, wherein the microphone array is adapted to generate:

(1) a first array output signal based on a difference between a first pair of element output signals corresponding to a first pair of flat portions separated by a first distance; and (2) a second array output signal based on a difference between a second pair of element output signals corresponding to a second pair of flat portions separated by a second distance different from the first distance.

28. The invention of claim 1, wherein the 3D shape is a polyhedron.

29. The invention of claim 28, wherein the flexible PCB comprises a plurality of rigid, polygonal sections interconnected by flexible, linear regions, wherein the flexible, linear regions are bent to achieve the polyhedral shape.

30. The invention of claim 29, wherein at least one of the microphone devices is mounted onto each rigid, polygonal section.

31. The invention of claim 1, wherein:

the flexible PCB is part of a first microphone sub-array; and the microphone array is a microphone array assembly formed by interconnecting the first microphone sub-array and at least a second microphone sub-array.

32. The invention of claim 31, wherein the first microphone sub-array is interconnected to the second microphone sub-array by interlocking a member of the first microphone sub-array within a cut-out portion of the second microphone sub-array.

33. The invention of claim 32, wherein:

the first microphone sub-array comprises:

at least two rigid PCB sections interconnected by at least one flexible PCB section; and one or more microphone devices mounted onto at least one rigid PCB section, wherein the at least one flexible PCB section is bent to achieve the 3D shape; and the cut-out portion of the second microphone sub-array receives a rigid PCB section of the first microphone sub-array.

34. The invention of claim 31, wherein the first microphone sub-array is interconnected to the second microphone sub-array by overlapping a portion of the first microphone sub-array with a portion of the second microphone sub-array.

35. The invention of claim 1, wherein:

the microphone devices are mounted onto the bent flexible PCB at different mounting locations;

each mounting location corresponds to a mounting plane that is orthogonal to a normal line to the surface of the bent flexible PCB at the mounting location; and the mounting planes corresponding to the microphone devices are not all mutually co-planar.

36. The invention of claim 35, wherein:

the plurality of microphone devices comprise more than three microphone devices; and the more than three microphone devices are mounted onto the bent flexible PCB at more than three different, non-co-planar mounting locations.

* * * * *